L. CHEVROLET & E. PLANCHE.
CONTROL LEVER FOR AUTOMOBILES.
APPLICATION FILED NOV. 15, 1911.

1,022,401.

Patented Apr. 9, 1912.

Witnesses
Chas. W. Stauffiger
Anna M. Dore

Inventors
Louis Chevrolet
Etienne Planche
By
Attorneys

UNITED STATES PATENT OFFICE.

LOUIS CHEVROLET AND ETIENNE PLANCHE, OF DETROIT, MICHIGAN, ASSIGNORS TO CHEVROLET MOTOR COMPANY, OF DETROIT, MICHIGAN, A CORPORATION OF MICHIGAN.

CONTROL-LEVER FOR AUTOMOBILES.

1,022,401.      Specification of Letters Patent.      Patented Apr. 9, 1912.

Application filed November 15, 1911. Serial No. 660,357.

*To all whom it may concern:*

Be it known that we, LOUIS CHEVROLET, a citizen of the Republic of Switzerland, and ETIENNE PLANCHE, a citizen of the Republic of France, both residing at Detroit, in the county of Wayne and State of Michigan, have invented certain new and useful Improvements in Control-Levers for Automobiles, of which the following is a specification, reference being had therein to the accompanying drawings.

This invention relates to a control lever especially adapted for automobile bodies of the fore-door type and the object of the invention is to so construct and combine a lever with the false door of a fore-door automobile body, that the lever will be entirely inclosed from view and the hand grip for operating the lever will project laterally into the body through the inner wall of said false door in a convenient position for operation and so as to protect the handle and prevent dirt and water from falling into the slot through which it projects.

A further object is to provide a simple and cheap construction especially adapted for the particular place in which it is located and to provide certain other new and useful features in the construction and arrangement of parts, the invention consisting in the matters hereinafter set forth and more particularly pointed out in the claims, reference being had to the accompanying drawing in which—

Figure 1:
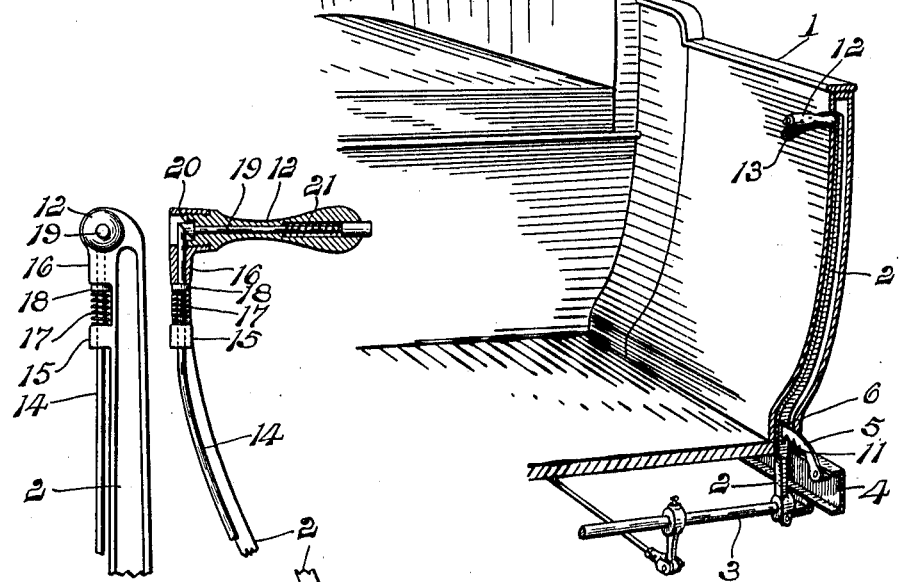
Figure 2:
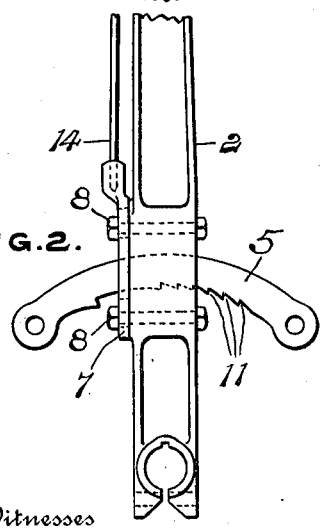
Figure 3:
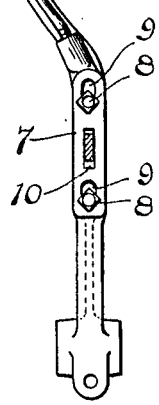

Figure 1 is a perspective detail of a portion of an automobile body of the fore-door type with this invention applied thereto; Fig. 2 is a side elevation of the lever detached; and Fig. 3 is an edge view of the same.

Automobile bodies of the fore-door type as commonly constructed, are provided with a fixed side or false door 1 which closes the side of the body at that side of the car where the control levers are located and this invention applies to the construction and arrangement of a control lever 2 which may be for operating any part of the automobile mechanism, but as shown in the drawing is provided to operate the emergency brakes, said lever being secured at its lower end to a transverse shaft 3 mounted in bearings on the automobile chassis 4, said shaft being rocked in its bearings to operate the brakes by a forward and backward movement of the lever. Secured to any convenient support, as to the chassis 4, is a suitable sector 5 which passes through a slot or opening 6 provided therefor in the lever and a slide or plate 7 is secured to one side of the lever by bolts 8 passing through slots 9 in the plate so that the plate may be moved vertically upon the side of the lever. This plate is also provided with a slot through which the sector passes and is formed with a tooth 10 at the lower end of the slot to engage the ratchet teeth 11 of the sector and hold the lever in the position to which it may be moved.

The false door 1 is preferably formed hollow and the lever 2 is arranged to extend upwardly within the space between the inner and outer walls of said false door, said lever being suitably bent to conform to the curvature of the side of the body. At the upper end, the lever 2 is provided with a laterally or inwardly extending hand grip 12 which projects through a suitably curved slot 13 in the inner wall of the false door near its upper edge. A push rod 14 is secured at its lower end to the plate 7 and being curved to conform to the shape of the lever, extends upwardly and is guided at its upper end in guide bearings 15 and 16. A spring 17 sleeved on the rod between the bearing 15 and a collar 18 normally holds the rod in raised position with the plate 7 moved upwardly into engagement with the sector. The hand grip 12 is provided with an axial bore to receive a push pin 19 which extends at right angles to the upper end of the push rod 14 and is provided with a head 20 having a beveled end face to engage the upper beveled end of the rod 14. A spring 21 sleeved upon the pin 19 within a recess in the handle 12 normally holds the pin with its outer end projecting a short distance through the inner end of the handle so that it may be readily pressed by the thumb of the operator when he grasps the handle and forced inward. When so moved inward the beveled head on the pin engaging the upper end of the rod 14, will force said rod downward and release the plate 7 from engagement with the sector so that the lever may be readily shifted to set the brakes.

By shaping the lever to conform to the curve of the false door and extending the same upward between the walls of said side or door, it takes up no room within the body and is protected and inclosed from view so that it will not be necessary to plate or otherwise finish it. The hand grip of the lever is extended through a slot in the inner wall of the false door in a very convenient position for manipulating the lever where it will not be seen from the exterior of the car and in such a position that water and dirt will not get into the slot.

Obviously, changes in the construction of the lever and the arrangement of the same may be made without departing from the spirit of our invention, and we do not wish to limit ourselves to the particular construction shown.

Having thus fully described our invention what we claim is:—

1. The combination of an automobile body of the fore-door type having a false door formed with an inner and an outer wall spaced apart, a control lever extending upward within the space between said walls, and means on said lever projecting laterally into the body for operating the lever.

2. The combination of an automobile body of the fore-door type having a hollow false door provided with a curved slot in its inner side, a lever pivotally supported at its lower end below the body and extending upward within the hollow side, and a handle on the upper end of the lever projecting laterally through said slot.

3. The combination of an automobile body of the fore-door type having a curved side formed with an inner and outer wall spaced apart and the inner wall provided with a curved slot, a control lever pivotally supported at its lower end below the lower edge of said body and curved to conform to the curvature of said body side, and extending upward in the space between the walls thereof, and a handle on the upper end of said lever projecting through said curved slot.

In testimony whereof we affix our signatures in the presence of two witnesses.

LOUIS CHEVROLET.
ETIENNE PLANCHE.

Witnesses:
   LEWIS E. FLANDERS,
   A. M. SHANNON.